July 22, 1947.　　W. J. PELTIER ET AL　　2,424,500
SUPPORT FOR SUN VISORS
Filed Nov. 17, 1944　　3 Sheets-Sheet 1
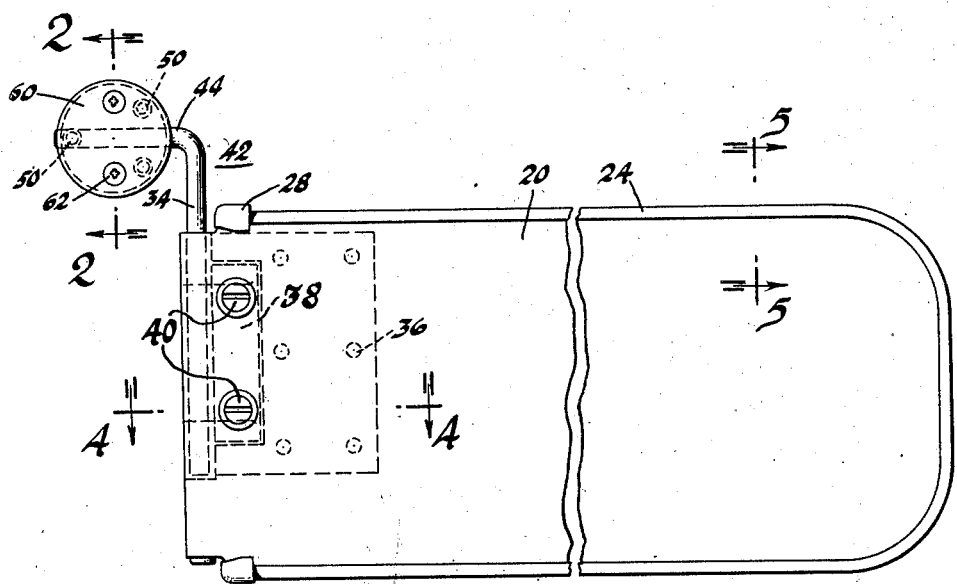
Fig. 1
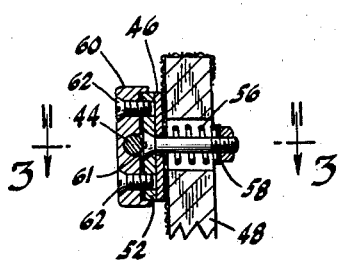
Fig. 2
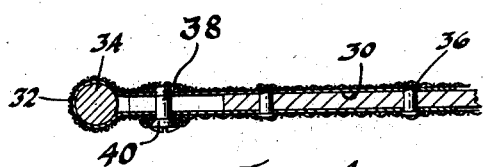
Fig. 4
Fig. 5
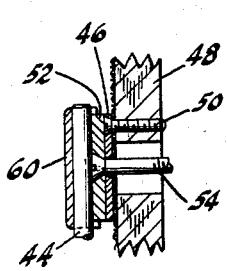
Fig. 3
INVENTORS
Walter J. Peltier &
BY Alton J. Diroff
Parker & Burton
attorneys

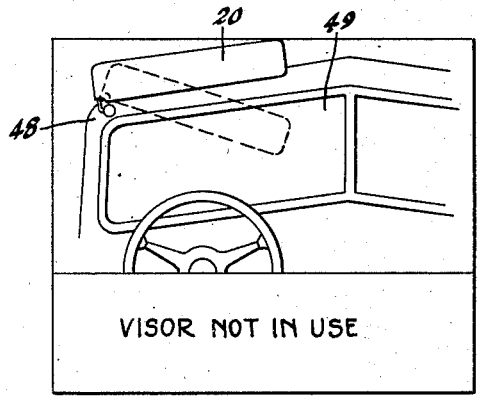
Fig. 6 — VISOR NOT IN USE
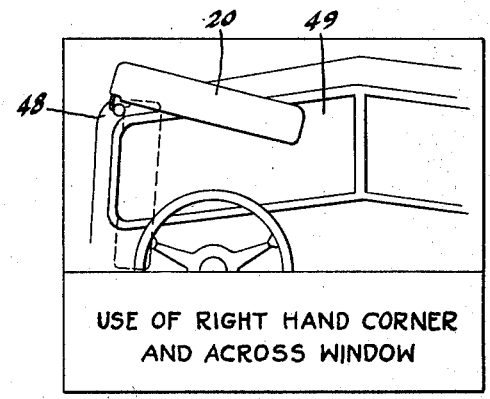
Fig. 7 — USE OF RIGHT HAND CORNER AND ACROSS WINDOW
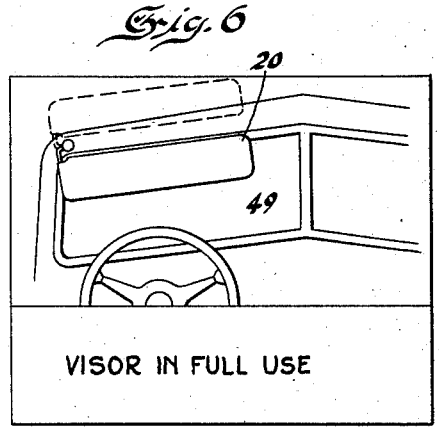
Fig. 8 — VISOR IN FULL USE
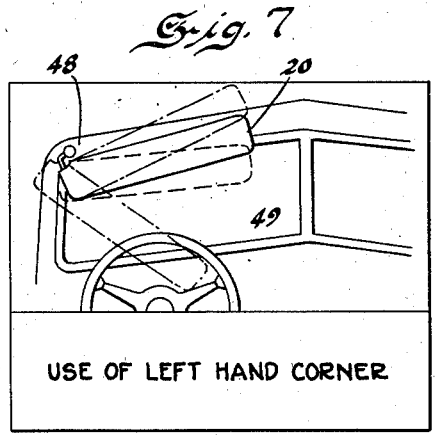
Fig. 9 — USE OF LEFT HAND CORNER
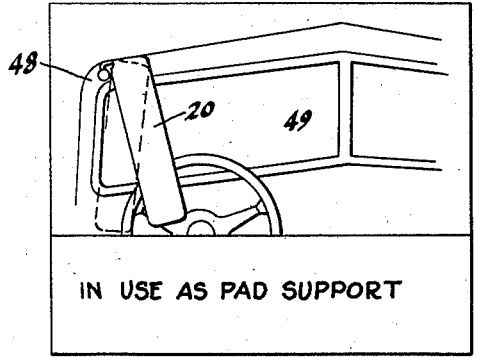
Fig. 10 — IN USE AS PAD SUPPORT
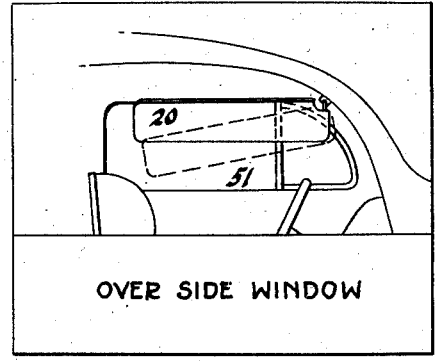
Fig. 11 — OVER SIDE WINDOW
INVENTORS
Walter J. Peltier &
BY Alton J. Dixoff
Parker & Burton
attorneys July 22, 1947. W. J. PELTIER ET AL 2,424,500
SUPPORT FOR SUN VISORS
Filed Nov. 17, 1944 3 Sheets-Sheet 3

VISOR, EXTENDED POSITION

SIDE WINDOW, EXTENDED

INVENTORS
Walter J. Peltier &
BY Alton J. Dizoff
Parker & Burton
ATTORNEYS

Patented July 22, 1947

2,424,500

UNITED STATES PATENT OFFICE 2,424,500

SUPPORT FOR SUN VISORS

Walter J. Peltier and Alton J. Diroff, Monroe, Mich., assignors to Woodall Industries Incorporated, Detroit, Mich., a corporation of Michigan Application November 17, 1944, Serial No. 563,837

4 Claims. (Cl. 248—278)

This invention relates to an improved sun visor assembly for a vehicle such as an automobile.

An object is to provide an improved sun visor assembly of simple, inexpensive construction for a vehicle having a windshield window opening and a side window opening, wherein the visor blade is readily adjustable to a plurality of relatively angular positions before either window opening and throughout a plane parallel to the opening.

Another object is to provide an improved sun visor assembly wherein the visor blade may be swung to bring only a selected portion of the blade, such as one of the two lower end corners thereof, into position before a selected portion of a window pane to interrupt light rays entering through said selected portion thereby obstructing the window pane only at that particular spot. This construction permits the light rays to be blocked at a selected objectionable spot while leaving substantially the entire remainder of the pane unobstructed.

Another object is to provide an improved sun visor assembly wherein the visor blade may be swung not only to an infinite plurality of relatively different positions before either window opening but in each position may be further swung to rest in part against the window pane thereby stabilizing the visor against rattle.

More specifically an object is to provide an improved sun visor assembly wherein the visor blade may be swung to snuggle, in part at least, closely against the pane in either window opening or may also be swung to snuggle against the head lining above a window opening to minimize vibration of the visor blade.

A meritorious feature is that the visor may be swung to incline angularly downwardly from its point of support at one end on the header to rest its opposite end against the steering wheel of the automobile whereby it may serve as a support for a writing pad or mirror for use of the driver.

Another object is the provision of an improved sun visor assembly of the character herein described wherein the visor may be pivotally swung to displace the visor blade linearly of the blade and horizontally with respect to the window opening to accomplish the same end as is now accomplished with what are known as extensible visors.

A further object is to provide a visor assembly wherein the visor blade is capable of the universality of movement herein set forth without the provision of complicated, expensive universal joints but with the employment of simple hinge and rod pivots of inexpensive sturdy construction.

An important characteristic of this improved visor is that the visor blade is pivotally mounted along one end upon one end portion of an angular hanger rod for swinging movement thereabout, and the opposite end portion of the hanger rod is pivotally mounted upon a rod support for swinging movement of the blade and rod as a unit relative to the rod support, and the rod support is pivotally mounted upon a fixed bracket base for swinging movement of the blade, rod, and rod support as a unit with respect to the base, and wherein the pivot mounting of the rod is at all times perpendicular to the other two pivot mountings, and wherein the construction is such that the visor blade will maintain itself at any position to which it may be swung upon its pivot mountings.

Other objects, advantages and meritorious features will more fully appear from the following description, appended claims and accompanying drawings, wherein:

Figure 1 is an elevation of visor mechanism embodying my invention.

Figure 2 is a cross sectional view taken on the line 2—2 of Figure 1.

Figure 3 is a cross sectional view taken on the line 3—3 of Figure 2.

Figure 4 is a cross sectional view taken on the line 4—4 of Figure 1.

Figure 5 is a cross sectional view taken on the line 5—5 of Figure 1.

Figures 6 through 13 are diagrammatic views showing relatively different positions of the visor blade before the window of the windshield and the side window of a vehicle upon which the visor is mounted.

Figure 12:
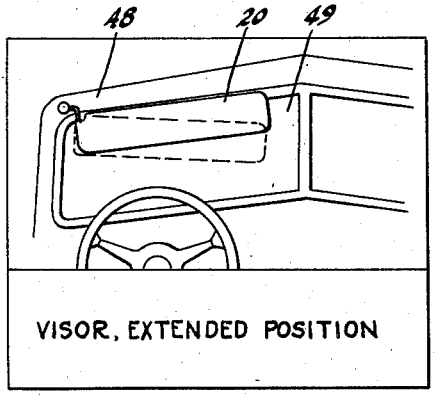

The visor blade 20 may be a conventional one consisting of a foundation panel 21 which may be formed of suitable composition board such as Masonite. The foundation is covered with upholstery fabric 22. A trim binding 24 is shown as extending about the margin and secured in place as by stitching 26. The ends of the binding may be covered with a finishing clip 28.

This visor blade is provided along one end margin with a pivot mounting which may be formed from a piece of sheet metal 30 folded upon itself to provide a tubular portion 32 adapted to receive an end 34 of an angular hanger rod. Complementary end portions of the metal strip 30 are secured to the opposite sides of the supporting panel by conventional means such as rivets 36, stitching or the like as shown in Figure 4.

The panel foundation 21 is cut away at such end so that the metal plate 30 extends beyond the end of the foundation panel. A reinforcing strip of metal 38 may be spot welded or otherwise secured to one end section of the metal strip 30 as shown in Figure 4. Adjusting screws 40 (two being here shown) are provided to draw the two end sections of the metal strip toward each other to compress the tubular portion 32 of the strip about the rod 34 to maintain close fitting engagement therabout so that the blade will frictionally maintain any position to which it is swung about the rod 34. These screws 40 are shown as threaded into the reinforcing strip 38.

The visor blade supporting rod, indicated generally in Figure 1 as 42 is of right angular shape. One angular end portion 44 is pivotally supported by a bracket assembly. The bracket assembly comprises in addition to the angular rod 42 a base plate 46 which is shown in the drawings as secured by screws 50 to the header 48 above a windshield opening 49 in a vehicle adjacent to a side window 51 of the vehicle. Three of these screws are shown in Figure 1. Rod supporting means is shown as rotatably supported upon the base plate 46.

The rod supporting means is illustrated as comprising a plate 52 and a cap 60 secured together to rotate as a unit relative to the base 46. The plate 52 superimposes the base plate 46 and is mounted thereon to rotate thereover by a pivot screw 54. The pivot screw 54 is shown as being held by a spring 56 which encircles the screw and bears at one end against the base plate and at the opposite end against a nut assembly 58 to exert yielding tension holding the rotatable plate 52 frictionally against the base plate 46. The rotatable plate 52 is shown as rotatable relative to the base plate about the axis of the screw but held by the spring under sufficient frictional pressure against the base plate to maintain the weight of the visor blade at any position of rotation of the plate 52 with respect to the base plate 46.

The cap 60 is held by screws 62 to the rotatable plate 52 to rotate therewith. This cup shaped cap 60 is provided with a groove 61 which extends diametrically across its inner face. The end 44 of the angular rod 42 is disposed within the groove 61 of the cap 60, as shown in Figure 2 and is held frictionally within the groove between the cap 60 and the plate 52 by the tightening screws 62 holding the cap toward the plate to maintain any position to which the rod is rotated.

Upon initial assembly clearance is provided between the inner face of the cap 60 and the outer face of the plate 52 to permit tightening of the screws to take up for wear. The rod is permitted rotation between the cap 60 and the plate 52 but is held frictionally therebetween to maintain any position to which rotated.

It will be seen that the visor blade has a plurality of pivotal movements about a plurality of simple straight pivots. These pivots are disposed angularly with respect to each other. The intermediate pivot, which is the pivot mounting of the short end of the rod between the cap 60 and the plate 52, is at all times perpendicular to the other two pivot mountings. These two other pivot mountings may be perpendicular to each other or may lie in parallel planes or in other relatively angularly disposed planes depending upon the position to which the visor blade is swung.

Due to this pivot mounting of the blade it is possible to move the blade to an almost unlimited plurality of positions with respect to either one of the two windows which the visor blade is adapted to obstruct. Not only can the blade be moved to interrupt the rays of the sun entering through either window but it can be disposed so that its free end or margin rests against the window pane and thereby minimizes any tendency to wobble or rattle. Furthermore, because of the manner in which the visor blade is supported it may be moved to lie substantially flat against either window pane. Not only will the blade snuggle close against the pane but it will also snuggle close against the header above the pane.

Some of the various positions which the blade may assume with respect to the windshield window opening and the side window opening are illustrated in Figures 6 through 13. In Figure 6 the visor blade 20 is shown in solid line as disposed against the header above the windshield. In Figure 7 the blade 20 is shown in solid line as having its outer lower corner swung downwardly over the windshield opening. In this movement the visor would pivot about the pivot mounting of the plate 52 upon the base plate 46. To swing the free lower end corner of the blade against the windshield the blade would also be swung about the pivot mounting of the short end 44 of the rod within the bracket assembly. Obviously, the blade could be moved to any angular position such as the one dotted line position in Figure 7 at the left end of the windshield opening or any angular position between these two.

In Figure 8 the visor is shown as swung downwardly in front of the windshield opening throughout the length of the visor blade. In this movement the blade would be pivoted about the short end 44 mounted within the bracket and it might also be swung about the pin 54 to vary the angular position of the blade in front of the windshield opening.

From the position shown in Figure 8 the blade may be swung to an angular position such as shown in Figure 9 wherein the lower left hand corner only obstructs the windshield opening. In this movement from Figure 8 to Figure 9 the blade swings about the pivot pin 54 and any angular position may be assumed. It is apparent from the positions shown in Figures 7 and 9 that selected corners of the blade may be employed to interrupt the sun's rays entering at selected spots through the windshield opening while leaving the major portion of such opening unobstructed.

From the position shown in Figure 6, the blade 20 may be swung to the position shown in Figure 10 wherein the free end of the blade rests against the steering wheel and may be used as a support for a writing pad or a mirror or the like.

From the positions shown in Figures 6 or 8 the blade may be swung to extend across the upper margin of the side window as shown in solid line in Figure 11. From the position shown in solid line in Figure 11 the blade may be swung about the pivot mounting of the rod within the bracket assembly to a plurality of angular positions over the side window. One of these angular positions is shown in dotted line. The blade may also be swung to bring its lower free margin against the side window as shown in Figure 15.

From the position shown in Figure 6, the blade may be swung to an extended position such as shown in Figure 12. In this movement the blade is swung about all three pivots. It will be noted that it is extended linearly a distance equal to twice the amount of the offset of the angular rod radially with respect to the pivot pin 54. It is possible to provide an offset so that the visor blade will substantially fill in the space between the end of the rear view mirror which is customarily mounted above the windshield and the side frame of the windshield opening.

Figure 13:
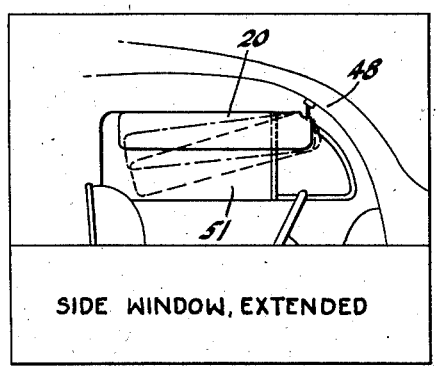
Figure 15:
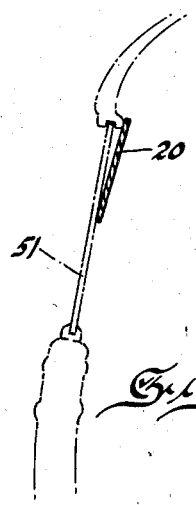
Figure 15 is a view similar to Figure 14 showing the position of the visor blade against the side window.
Figure 16:
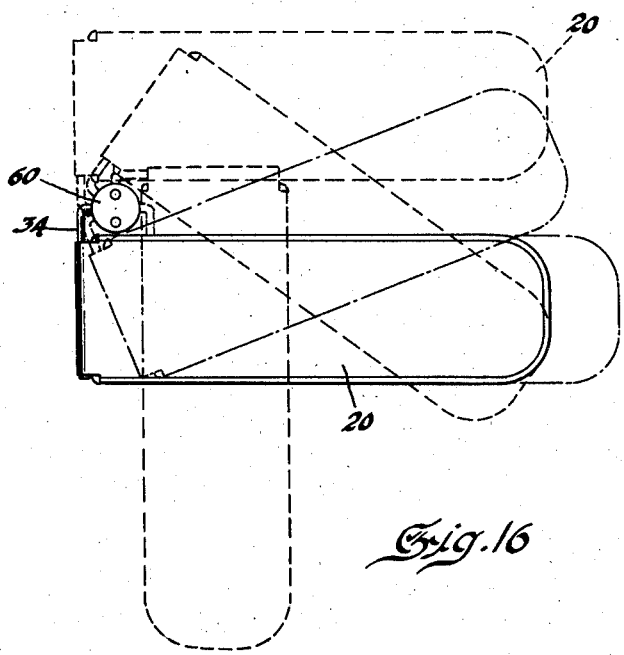
Figure 16 is a diagrammatic view showing a plurality of relatively angular positions of dispositions of the visor blade as permitted by its mounting.
Figure 14:
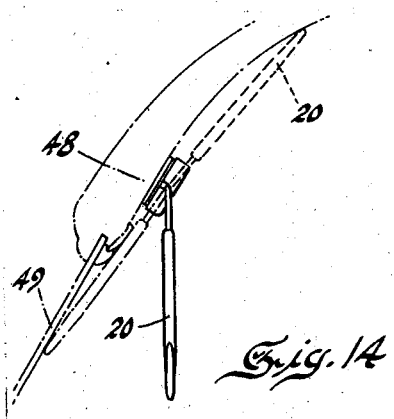
Figure 14 is a diagrammatic end view of the visor showing its position against the windshield window and against the header above the windshield.

From the position shown in Figure 8 the visor blade may be swung about its pivot mounting upon the rod 42 to an extended position overlying the side window as shown in Figure 13 and upon swinging movement about its other pivot mountings it may be moved outwardly so that its free margin rests against the side window as shown in Figure 15. In this position it is extended across the side window a greater distance than is shown in Figure 11 due to the offset at the bracket.

What we claim is:

1. Sun visor mechanism for use in a vehicle body having a windshield window opening and a side window opening, said sun visor mechanism comprising, in combination, a bracket base adapted to be fixed to the body adjacent to said two window openings, a bracket rod support pivotally mounted upon the base for rotatable adjustment to a plurality of positions with respect to the base and held yieldingly thereagainst to maintain different positions of rotatable adjustment, an angular hanger rod having one end portion journaled upon the rod support for rotatable adjustment to a plurality of positions relative to the support about an axis extending angularly with respect to the pivot mounting of the rod support upon the base and held thereby to maintain said positions of rotatable adjustment and carried by the rod support for rotatable adjustment therewith relative to the base, an elongate visor blade pivoted along one margin upon the opposite angular end portion of the rod for swinging rotatable adjustment thereabout upon an axis disposed angularly with respect to the pivot axis of the rod upon the rod support and adapted to yieldingly maintain different positions of rotatable adjustment.

2. Sun visor mechanism for use in a vehicle body having a windshield window opening, a side window opening and a wall portion adjacent thereto, said sun visor mechanism comprising, in combination, a bracket base plate adapted to be fixed to the body adjacent to said two window openings, a bracket rod supporting plate pivoted to and juxtaposing the base plate for rotation relative thereto about a pivot disposed substantially perpendicular to the base plate and held yieldingly thereagainst to maintain different positions of rotation, an angular hanger rod having one end portion journaled within the supporting plate diametrically of the pivot mounting of said plate upon the base plate and for rotation about an axis disposed substantially perpendicular to the pivot of the plate, said end portion of the rod being so journaled within the supporting plate as to have permitted adjustable rotation relative thereto and to maintain adjusted positions of rotation, the opposite end portion of the rod extending perpendicularly to the end portion which is journaled within the rod supporting plate and being radially offset from the pivot mounting of the rod supporting plate upon the base plate and an elongate visor blade pivotally mounted along one end margin upon said opposite end portion of the rod for rotation thereabout and adapted to maintain positions of rotatable adjustment thereabout.

3. Sun visor mechanism for a vehicle body having a windshield window opening, a side window opening, and a wall portion disposed adjacent to said openings, said sun visor mechanism comprising, in combination, a base plate adapted to be secured to said wall portion, a rod-supporting plate pivotally mounted upon the base plate for rotation about a pivot disposed substantially perpendicular thereto and held yieldingly thereagainst to maintain adjusted positions of rotation with respect thereto, a rigid L-shaped rod having a short leg and a long leg and having its short leg journaled upon the rod-supporting plate for rotation about the axis of the leg substantially normal to the pivot mounting of the rod-supporting plate and for rotation with the rod-supporting plate about its pivot mounting, a visor blade pivoted along one margin upon the long leg of the rod for rotation about the axis thereof, which axis extends substantially normal to the axis of the short leg.

4. Sun visor mechanism for a vehicle body having a windshield window opening and a side window opening, said visor mechanism comprising, in combination, a bracket base adapted to be secured to the body adjacent to said two window openings, a rod supporting member pivotally mounted upon the base by a pivot pin extending through the base and provided with a spring rearwardly of the base yieldingly urging the pin to hold said member against the base to maintain different positions of rotatable adjustment relative thereto, an angular hanger rod having one end portion journaled within said member substantially perpendicular with respect to the axis of the pivot pin and having a bearing thereon for rotatable adjustment and adapted to maintain positions of rotatable adjustments and a visor blade journaled along one margin upon the opposite end of the rod for rotation thereabout and adapted to maintain said positions of rotatable adjustment.

WALTER J. PELTIER.
ALTON J. DIROFF.

REFERENCES CITED

The following references are of record in the file of this patent:

UNITED STATES PATENTS

| Number | Name | Date |
|---|---|---|
| 1,941,032 | Knowles | Dec. 26, 1933 |
| 1,944,468 | Schaffner | Jan. 23, 1934 |
| 2,037,303 | Battee | Apr. 14, 1936 |
| 1,590,203 | Olssen et al. | June 29, 1926 |
| 1,664,124 | Lorenz | Mar. 27, 1928 |
| 1,745,695 | Hunter | Feb. 4, 1930 |
| 1,772,233 | Vivier | Aug. 5, 1930 |
| 2,305,584 | Arbron | Dec. 22, 1942 |